(12) United States Patent
Jordil et al.

(10) Patent No.: US 7,263,780 B2
(45) Date of Patent: Sep. 4, 2007

(54) MOTORIZED ORIENTABLE MEASURING HEAD

(75) Inventors: Pascal Jordil, Ecoteaux (CH); Claude Rouge, Baulmes (CH)

(73) Assignee: Tesa SA, Renens (CH)

( * ) Notice: Subject to any disclaimer, the term of this patent is extended or adjusted under 35 U.S.C. 154(b) by 0 days.

(21) Appl. No.: 11/291,939

(22) Filed: Nov. 30, 2005

(65) Prior Publication Data
US 2006/0112579 A1 Jun. 1, 2006

(30) Foreign Application Priority Data
Dec. 1, 2004 (EP) ................... 04106226

(51) Int. Cl.
*G01B 5/20* (2006.01)
(52) U.S. Cl. .......................... 33/556; 33/559
(58) Field of Classification Search ................. 33/559, 33/556
See application file for complete search history.

(56) References Cited

U.S. PATENT DOCUMENTS

| | | | |
|---|---|---|---|
| 5,212,646 A * | 5/1993 | McMurtry | 700/161 |
| 5,675,902 A * | 10/1997 | Chase | 33/559 |
| 5,979,070 A * | 11/1999 | Lau | 33/559 |
| 6,170,358 B1 | 1/2001 | Hunter | |
| 6,546,643 B2 * | 4/2003 | Lotze et al. | 33/559 |
| 2004/0149057 A1 | 8/2004 | Jordil | |
| 2006/0196066 A1 * | 9/2006 | Lloyd et al. | 33/559 |

FOREIGN PATENT DOCUMENTS

| EP | 0 392 660 A | 10/1990 |
|---|---|---|
| GB | 2 298 488 A | 9/1996 |

* cited by examiner

*Primary Examiner*—Christopher W Fulton
(74) *Attorney, Agent, or Firm*—Pearne & Gordon LLP

(57) ABSTRACT

Motorized indexed measuring head for a machine for measuring three-dimensional coordinates. Includes a double-action actuator to pass from a locked state, wherein any rotation of the probe feeler is prohibited, to an unlocked state, wherein the feeler can be oriented along two axes by two servomotors. The locking and unlocking mechanism is independent from the gravitational force and can operate whatever the orientation of the measuring head.

13 Claims, 5 Drawing Sheets

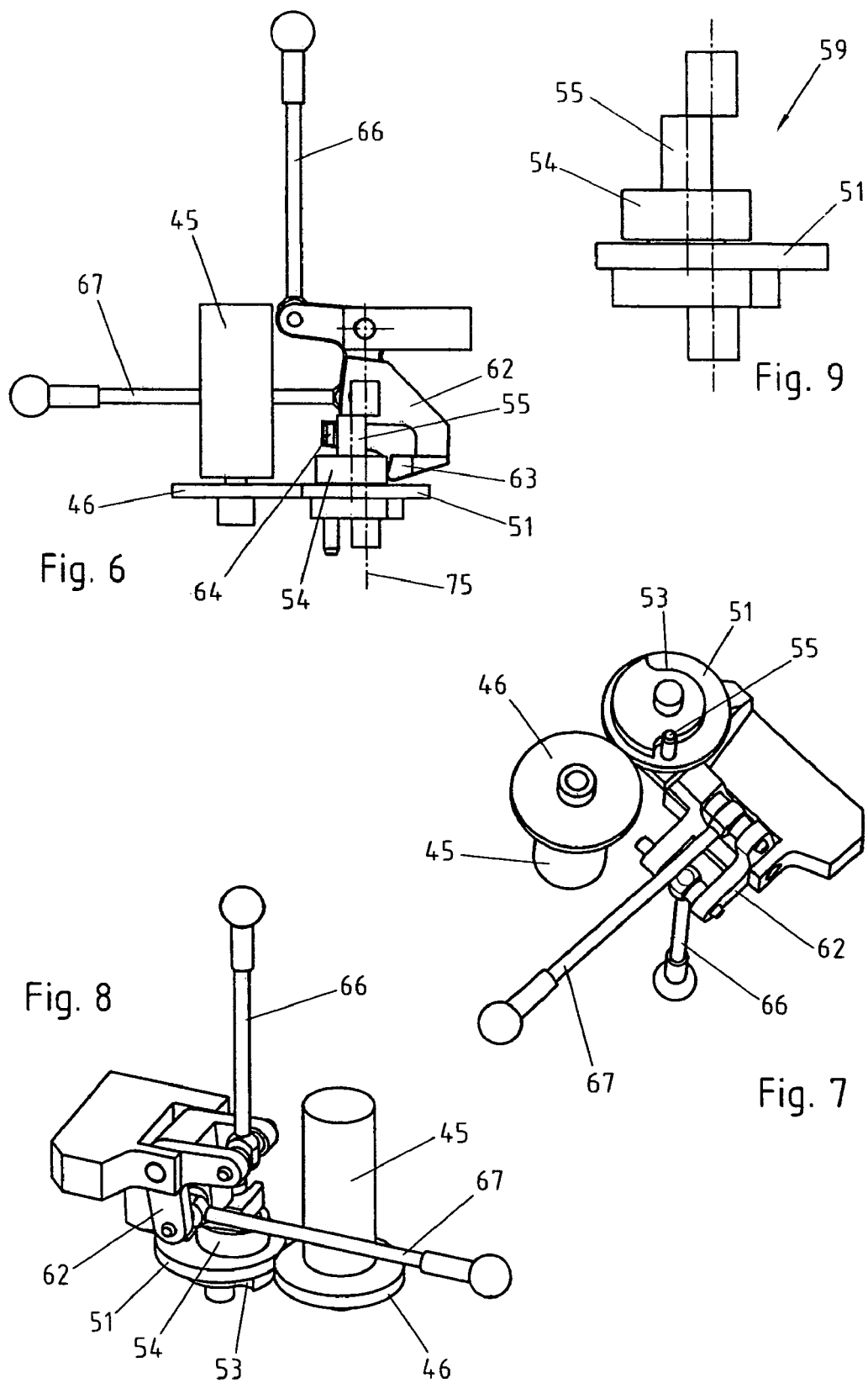

MOTORIZED ORIENTABLE MEASURING HEAD

REFERENCE DATA

This application claims priority from European patent application 2004EP-106226 filed on Dec. 1, 2004, the contents whereof are hereby incorporated by reference.

TECHNICAL FIELD

The present invention concerns a re-orientable measuring head for measuring three-dimensional coordinates of a mechanical part and notably, though not exclusively, a re-orientable measuring head designed to be used on a manual or automatic machine for measuring coordinates.

RELATED ART

Touch probes are measuring instruments used for example on production lines of mechanical parts, for checking dimensions or surfaces of machined parts. Touch probes are also used for capturing the three-dimensional shape of complex pieces, in order for example to reproduce or model them.

Probes generally comprise a measuring head, designed to be fastened onto the arm of a measuring machine and a mobile feeler, comprising a sphere at the end of an elongated rod and designed to be brought into contact with the piece to be measured.

In most applications, touch probes are fastened on the mobile arm of a machine whose position in space can be determined accurately by means of a manual or automatic measuring system, such as for example position encoders placed on the axes of the machine. The mobile arm is moved in space to bring the probe's measuring feeler into contact with the piece or surface to be measured. During contact, a deflective force is then applied on the feeler, moving it away from its initial resting position. A sensor reacts to the slightest displacement of the feeler, generating an electric signal that is sent either to the user, in the form of a light signal, or to the machine's control software which thus determines, on the basis of the data of the measuring system, the coordinates of the contact point within a given reference frame. For this purpose, the prior art uses electromechanical or optical sensors or movement sensors based on different principles, for example sensors comprising constraint gauges.

In the case of a three-dimensional touch probe, the connection between the feeler and the fixed part of the measuring head is usually realized according to the principle of the Boys connection, i.e. for example by three cylindrical pins resting on six spheres so as to define six contact points between the fixed organ and the feeler. Two- and one-dimensional probes are however also known.

When the probe is used for measuring pieces of complex shape, having cavities and protuberances, it is difficult or even impossible to bring the feeler into contact with the entire surface of the piece without the fixed part of the measuring head or the feeler's rod interfering with elements of the piece to be measured. To remedy this inconvenience, measuring heads are known that allow the contact feeler to be oriented in a plurality of directions in space. Generally, two independent rotation axes are required to cover all the possible orientations. An instrument of this type is described in European patent application EP0392660.

Use of this type of devices is however not limited to contact feelers and they can also be used with probes without contact, for example video cameras, for inspecting and checking machined parts for example.

The rotation axes are preferably indexed, in the sense that a sufficiently large but finite number of predetermined and accurately reproducible resting positions are provided. This arrangement avoids the measuring machine having to be re-calibrated after each change in orientation of the feeler.

The indexing of the feeler's rotation axes is achieved by indexing surfaces that engage mutually and define the desired resting positions, for example by a crown of spheres in which three pins engage. An example of this type of indexing mechanism is presented in European patent application EP1443299 in the name of the applicant.

For measuring complex pieces, it is desirable that the measuring head be motorized in order to orient the probe feeler automatically, upon command from the measuring machine's control program. For this purpose, the rotating and the locking of the feeler's axes are performed by electromagnetic actuators, for example engines or servomotors that move the indexing surfaces away and imprint a rotation to the axes.

One limitation of the known motorized measuring heads is that when the head is unlocked, it is difficult to define accurately the feeler's position, since neither the distance between the indexing surfaces nor the locking performance time are known accurately. This uncertainty can increase the response time of the measuring machine and lead to unwanted collisions between the feeler and the piece to be measured.

Another limitation of the known motorized measuring heads is that the locking system depends on the gravitational force or that their functioning can be influenced by the orientation of the measuring head. Their operation is thus problematic or impossible when the head is not oriented vertically.

The inertia forces linked to the mass of the probe feeler can also influence negatively the functioning of the measuring head, notably if massive feelers and considerable translation speeds are used.

One additional limitation of the known measuring heads is that, in unlocked position, the distance between the indexing surfaces is not rigorously defined. Collisions between the indexing balls and pins are thus possible during rotation of the feeler axes. This kind of collision naturally has negative consequences on the indexing accuracy.

DESCRIPTION OF THE INVENTION

One aim of the present invention is to propose a measuring head free of the limitations of the known devices and, notably, a measuring head wherein the feeler's trajectory is completely mastered, even during locking and unlocking operations.

Another aim of the present invention is to propose an indexed motorized measuring head wherein the orientation of the probe feeler can be modified for any orientation of the measuring head.

Another aim of the present invention is to propose a measuring head wherein any unwanted collision between the indexing surfaces is impossible.

These aims are achieved by the device comprising the combination of characteristics that are the object of the main claim, and notably by a re-orientable measuring head for orienting a probe feeler relatively to a measuring apparatus comprising: a support element; a first mobile element connected to said support element capable of turning around a first axis relatively to said support element; an automatic actuator, capable of being in a locked state and an unlocked state; wherein said automatic actuator is arranged to exert: an unlocking force on said first mobile element to move said first mobile element away from said support element and allow the rotation around said first axis when said actuator is in the unlocked state; a locking force on said first mobile element to tighten said first mobile element against the support element and prevent the rotation around said first axis when said actuator is in the locked state.

BRIEF DESCRIPTION OF THE DRAWINGS

The present invention will be better understood by reading the description given by way of example and illustrated by the attached figures showing:

FIG. 5 to 8, different views of the actuator responsible for the locking and unlocking according to one aspect of the invention;

FIG. 9, a detailed view of a crankshaft included in the actuator of FIGS. 5-8.

EMBODIMENT(S) OF THE INVENTION

Figure 1:
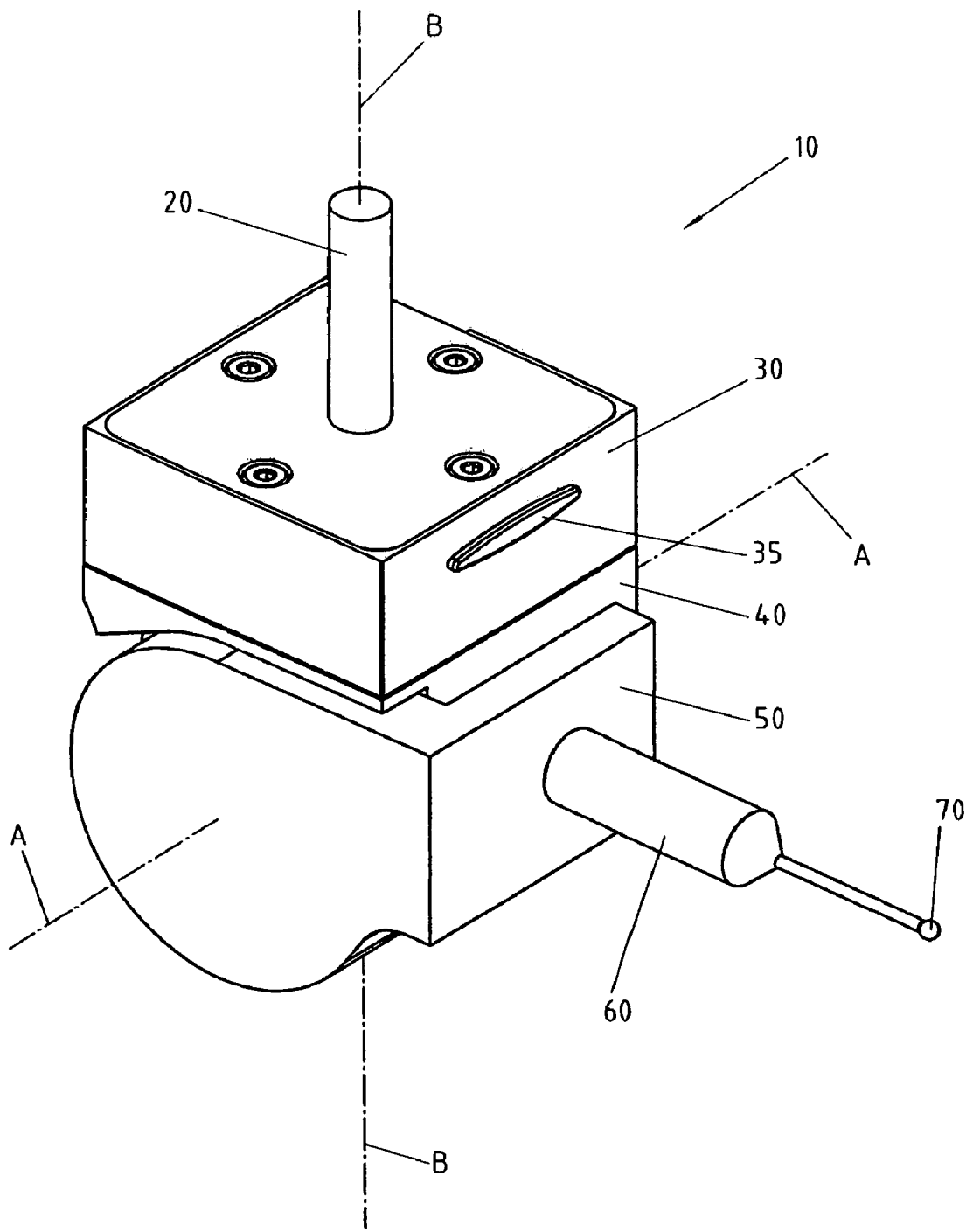
FIG. 1, a view of a motorized measuring head according to the invention.

With reference to FIG. 1, a re-orientable measuring head 10 according to the invention comprises a support 30 designed to be fastened onto the arm of a measuring machine, capable of moving, for example along three axes of coordinates X, Y and Z inside a measuring volume. It can be fastened for example by the rod 20 or by any other fastening means.

Hereinafter, for the sake of simplicity, the designation "vertical" will be used for referring to the orientation of the axis B in FIG. 1. This designation refers to the conventional orientation of the figures and also to the orientation in which the inventive device is normally used and usually coincides with the direction of the vertical axis Z of the measuring machine onto which the probe is mounted. However, the probe can be used with any orientation in space.

A first mobile element 40 is fastened to the support 30, so as to be able to turn around the vertical axis B. The first mobile element 40 can preferably take up a plurality of indexed positions, corresponding to multiples of a small predetermined angle, for example 10 degrees. In known fashion, these indexed positions are determined for example by an isostatic connection defining six resting points between positioning elements whose position is determined with great accuracy.

The second mobile element 50 is free to turn around the horizontal axis A united with the first mobile element 40. The rotation of the second mobile element 50 around the axis A can be continuous or indexed, motorized or manual, as for the first mobile element 40 here above.

A probe feeler 60 is fastened to the second mobile element 50 and bears, at its extremity, a sphere 70 designed to come into contact with the piece to be measured. A detection mechanism, not represented, thus responds to the slightest displacement of the sphere 70 relatively to the resting position with an electric signal that is sent either to the light display 35 or to the machine's control software, by a connector (not represented).

The locking and unlocking mechanism of the axes according to one aspect of the invention will now be described with reference to FIGS. 2 and 3.

The support 30 bears a series of balls 31 placed along a circumference with a usually constant angular distance, for example by 10°, so as to define a series of indexed position usually regularly spaced. The first mobile element 40 bears, corresponding to the balls 31, three pins 41 at a distance of 120° and capable of engaging with the balls 31. In locked position (FIG. 2), the first mobile element 40 is brought, by pulling the rod 66, against the fixed element 30. Each of the pins 41 then touches two adjacent balls 31 so as to have an isostatic connection between the support element 30 and the mobile element 40, according to the principle of the Boys connection.

In equivalent manner, in the frame of the present invention, it would be possible to exchange the position of the balls and of the pins, by placing the first on the mobile element and the latter on the support element. One could also replace the balls and pins by other positioning elements capable of defining six contact points between the support element 30 and the mobile element 40.

One extremity of the vertical rod 66 is fastened in articulated manner to the support element 30 whereas the other extremity of the rod 66 is fastened in articulated manner to one arm of the lever 62, capable of pivoting around the axis 65, fixed relative to the first mobile element 40. The rod 66 is preferably aligned with the rotation axis B.

Figure 2:
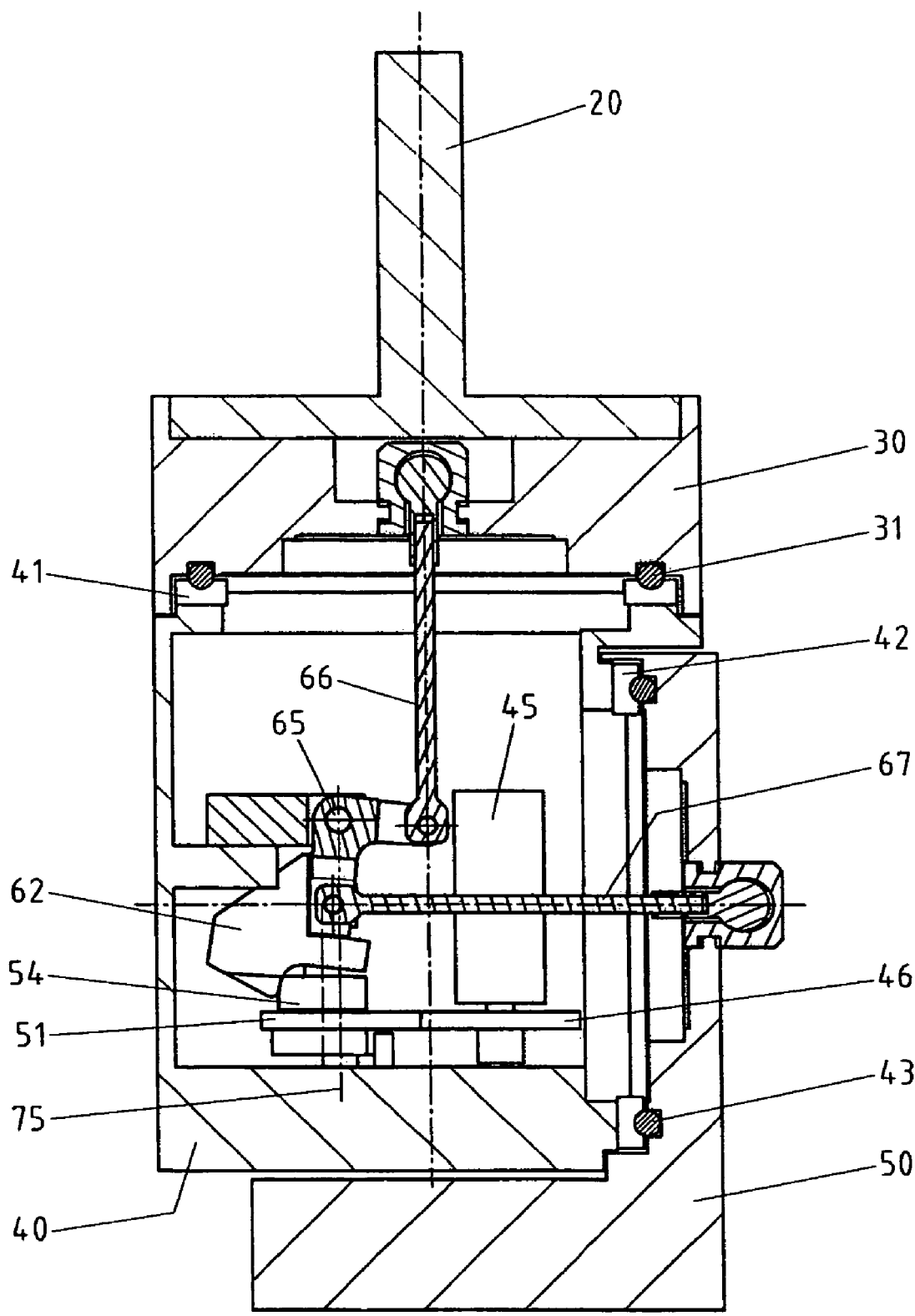
FIG. 2, a cross section of the inventive measuring head in locked position.

In the locked state of FIG. 2, the rod 66 is tensioned and pulls the first mobile element 30 upwards so that the indexing pins 41 engage with the balls 31 of the support 30. In this state, any rotation around the axis B is impossible and the mobile element 40 is locked in one of the indexed positions.

The force exerted by the rod 66 is applied centrally relatively to the contact points between the balls 31 and the pins 41, and is oriented along the axis B. In this manner, one achieves an equal distribution of the contact forces between the balls 31 and the pins 341 for a maximum indexing accuracy.

The second mobile element 50 is also held against the first mobile element 40 by the tension of the horizontal rod 67 aligned with the axis A. The rod 67 is articulated on the one hand relatively to the mobile element 50 and on the other hand relatively to the lever 62.

A second set of balls 43 and of pins 42, placed between the first and second mobile elements, allows the rotation of the second mobile element 50 to be locked in an indexed position.

Optionally, the rods 66 and 67 comprise elastic elements (not represented), for example metallic springs, to ensure a constant indexing force between the pins 41, 42 and the balls 31, 43. In equivalent manner, elastic elements could be included in the lever 62 or in the first and second mobile elements.

With reference to FIGS. 5-9, the position of the lever 62 is determined by the crankshaft 59, represented in detail in FIG. 9, driven in rotation around the axis 75 by the electric motor 45 and the dented wheels 46, 51. In equivalent manner, the crankshaft 59 could be driven directly by a motor placed on the same axis 75 of the crankshaft 59 or by any mechanical transmission, for example by a system of pulleys.

One arm of the lever 62 comprises a fork whose two branches 63 and 64 contact the two opposite sides of the crank pin 55 of the crankshaft 59, so as to move the lever 62 from the locked position to the unlocked position when the crankshaft 59 turns by 180°. Optionally, a ball bearing is interposed between the crank pin 55 and the fork in order to reduce friction during locking and/or unlocking. In the embodiment illustrated in the figures, a bearing 54 is provided only to correspond to the branch 63 that transmits the locking force. To correspond to the other branch 64 of the fork, responsible for unlocking, the efforts required are less and a simple antifriction bearing can be used.

The rotation of the crankshaft 59 around the axis 75 is limited to a rotation angle slightly greater than 180° by the sector 53 and the pin 55 united with the first mobile element 30. The stop positions of the pin 55 against the extremities of the sector 53 are disposed so as to overtake the points of equilibrium and thus to define stable resting positions corresponding respectively to the locked state and to the unlocked state.

Figure 3:
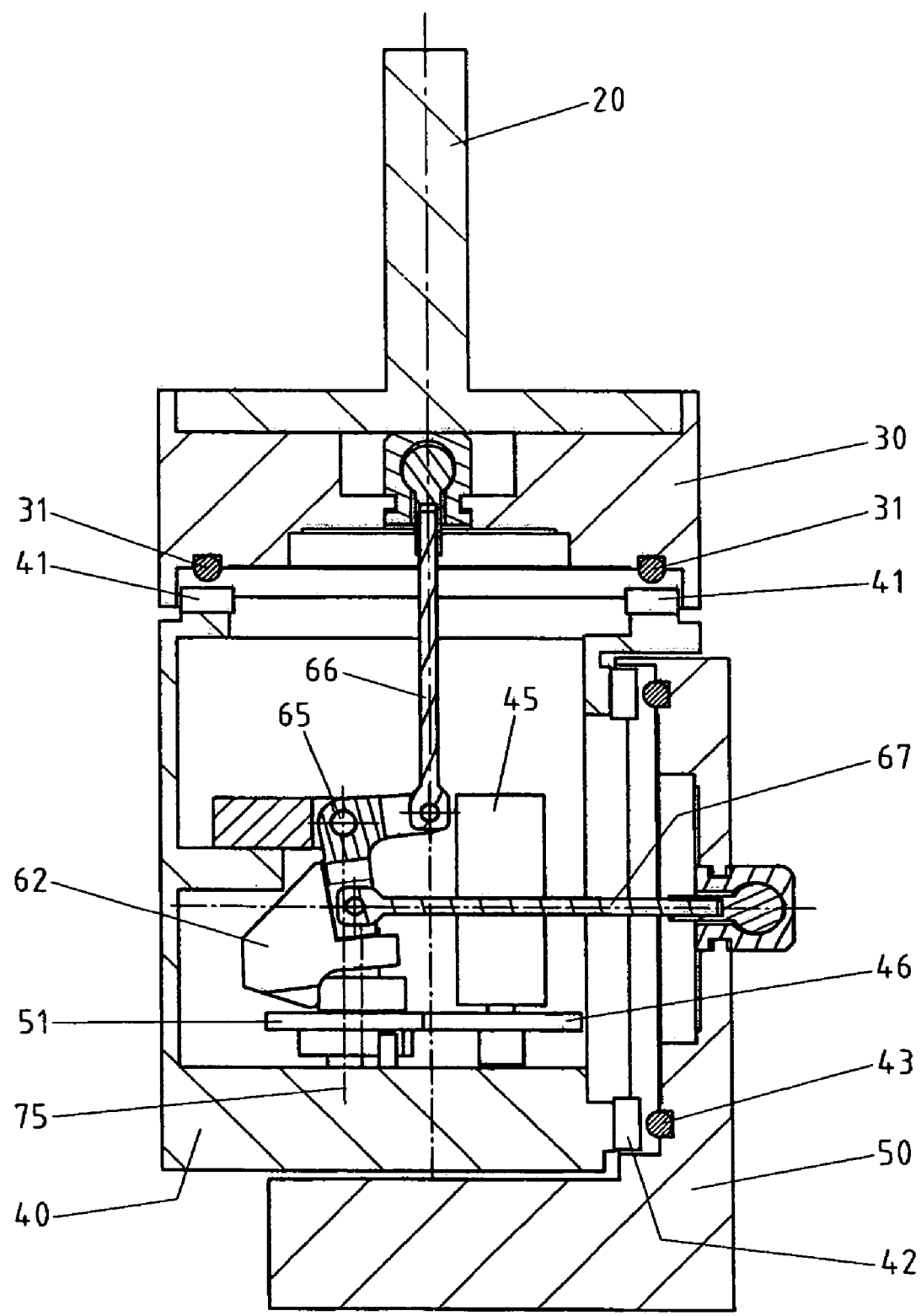
FIG. 3, a cross section of the inventive measuring head in unlocked position.
Figure 4:
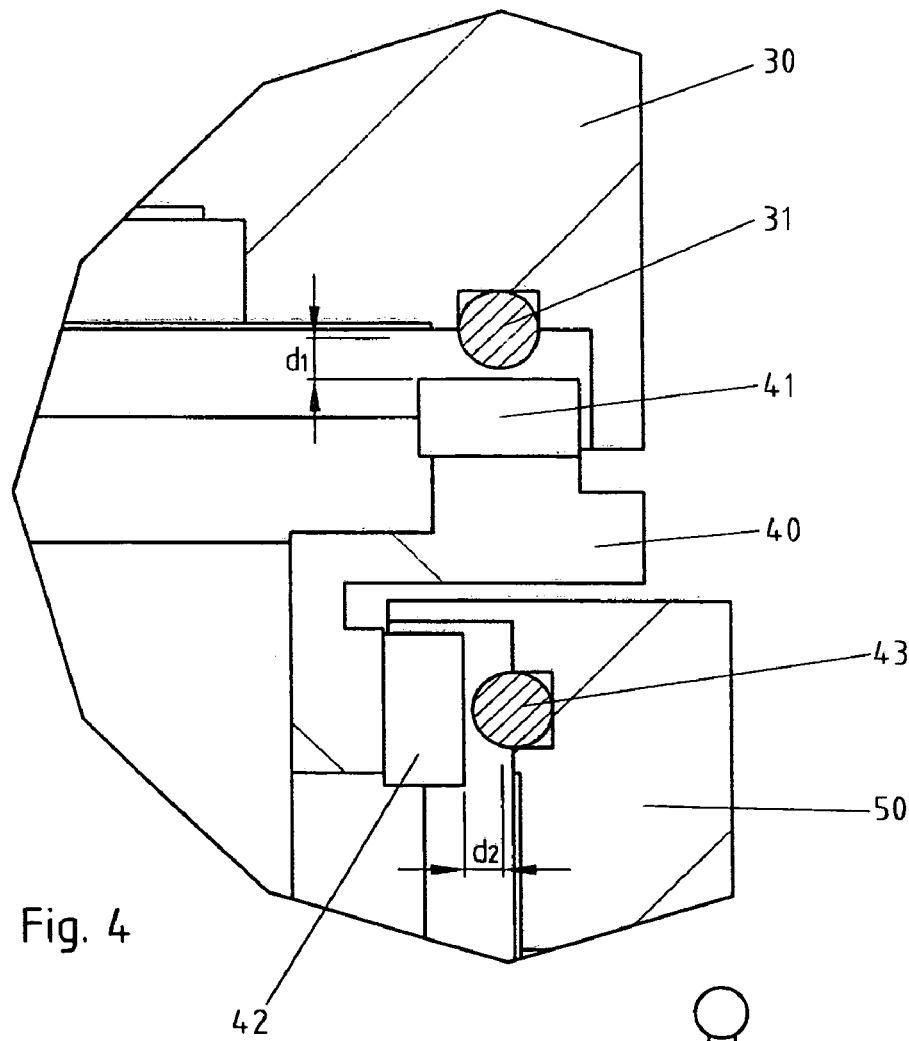
FIG. 4, a detail of the locking/unlocking mechanism of the inventive measuring head.
Figure 5:
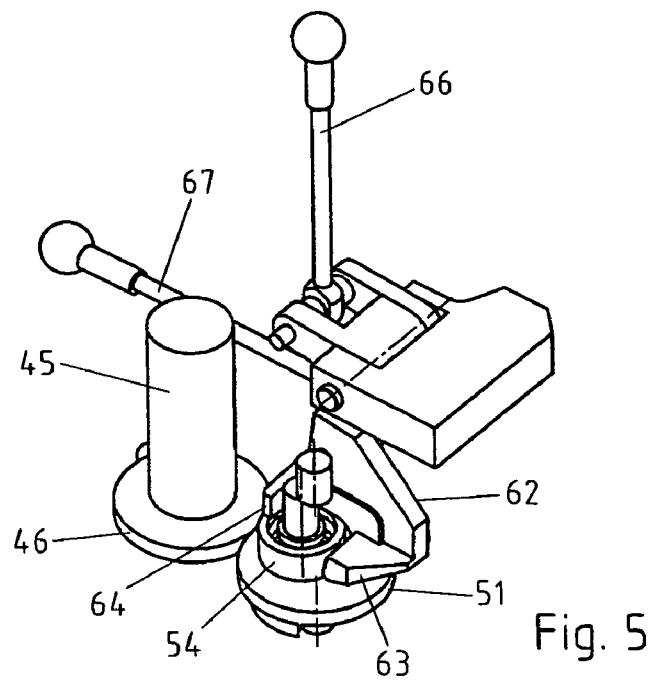

The FIGS. 3 and 4 represent the measuring head according to the invention in its unlocked state. In this case, the lever 62 is inclined and the rods 66 and 67 press on the support element 30 respectively on the second mobile element 50 so as to move the indexing elements 31, 41 respectively 42, 43 apart by a predetermined distance d1, respectively d2.

In a variant embodiment, the rods 66 and 67 could be driven by a pinion/rack unit.

The moving apart and the closing of the indexing surfaces take place thanks to the double action of the rods 66 and 67 which is independent of the direction of the weight force and of the inertia forces, and without springs or elastic elements having to be used. The inventive mechanism can thus also ensure a reliable and fast functioning whatever the orientation of the measuring head.

In unlocked position, the rotation around the two axes A and B is ensured by servomotors (not represented), controlled by the software of the measuring machine, or by other equivalent automatic actuators.

The embodiment described here comprises a single actuator for locking and unlocking the two axes A and B simultaneously. The invention however also includes variants in which each rotation axis is locked and unlocked by an independent actuator.

In one embodiment, the inventive measuring head comprises only a single rotation axis, for example a horizontal axis A.

The invention claimed is:

1. Re-orientable measuring head for orienting a probe feeler relatively to a measuring apparatus, including:
a support element;
a first mobile element connected to said support element and capable of turning around a first axis relatively to said support element;
an automatic actuator, capable of being in a locked state and an unlocked state;
wherein said automatic actuator is arranged to exert:
an unlocking force onto said first mobile element to move said first mobile element away from said support element and allow the rotation around said first axis when said actuator is in the unlocked state;
a locking force on said first mobile element to tighten said first mobile element against the support element and prevent the rotation around said first axis when said actuator is in the locked state.

2. The measuring head of claim 1, including:
a plurality of mobile positioning elements united with said first mobile element;
a plurality of fixed positioning elements united with said support element and capable of engaging with said mobile positioning elements to define a plurality of predetermined orientations of said first mobile element relatively to said fixed element.

3. The measuring head of claim 1, wherein said first mobile element and said support element are moved apart by a predetermined distance when said actuator is in unlocked state.

4. The measuring head of claim 3, including a rigid rod whose one extremity is fastened in articulated manner to said first mobile element and whose other extremity is fastened in articulated manner to said automatic actuator to transmit said locking force and said unlocking force.

5. The measuring head of claim 1, wherein said automatic actuator includes an electric motor.

6. The measuring head of claim 4, wherein said rod is arranged for pulling on said first element mobile when said actuator is in locked state and for pushing on said first mobile element when said actuator is in unlocked state.

7. The measuring head of claim 4, wherein said automatic actuator includes an electric motor and a lever whose one arm is articulated with one extremity of said rigid rod and wherein said motor acts on a shaft to make said lever oscillate between a locked position and an unlocked position.

8. The measuring head of claim 1, wherein the locking and unlocking are independent from the orientation relatively to the gravitational force.

9. The measuring head of claim 1, including a rotation actuator for turning said first mobile element relatively to the support element when the automatic actuator is in unlocked position.

10. Re-orientable measuring head for orienting a probe feeler relatively to a measuring apparatus, including:
a support element;
a first mobile element connected to said support element and capable of turning around a first axis relatively to said support element;
an automatic actuator, capable of being in a locked state and an unlocked state;
wherein said automatic actuator is arranged to exert:
an unlocking force onto said first mobile element to move said first mobile element away from said support element and allow the rotation around said first axis when said actuator is in the unlocked state;
a locking force on said first mobile element to tighten said first mobile element against the support element and prevent the rotation around said first axis when said actuator is in the locked state,
a second mobile element connected with said first mobile element so as to be capable of turning around a second axis relatively to said first mobile element;
wherein said automatic actuator is arranged to exert:
an unlocking force on said second mobile element to move said second mobile element away from said first mobile element and allow the rotation around said second axis when said actuator is in the unlocked state;
a locking force to engage the second mobile element with the first mobile element when said actuator is in the locked state.

11. The measuring head of claim 10, including a first rigid rod whose one extremity is fastened in articulated manner to said first support element and whose other extremity is fastened in articulated manner to said automatic actuator and a second rigid rod whose one extremity is fastened in articulated manner to said second mobile element and whose other extremity is fastened in articulated manner to said automatic actuator, and wherein said automatic actuator comprises an electric motor and a lever whose one arm is articulated with one extremity of said rigid rod and wherein said motor acts on a shaft to make said lever oscillate between a locked position and an unlocked position.

12. The measuring head of claim 11, wherein said first rod and second rod are essentially orthogonal and aligned with the first rotation axis respectively with the second rotation axis.

13. The measuring head of claim 10, including a rotation actuator for turning said first mobile element when the automatic actuator is in unlocked state.

* * * * *